Inventor.
Oswald F. Packer

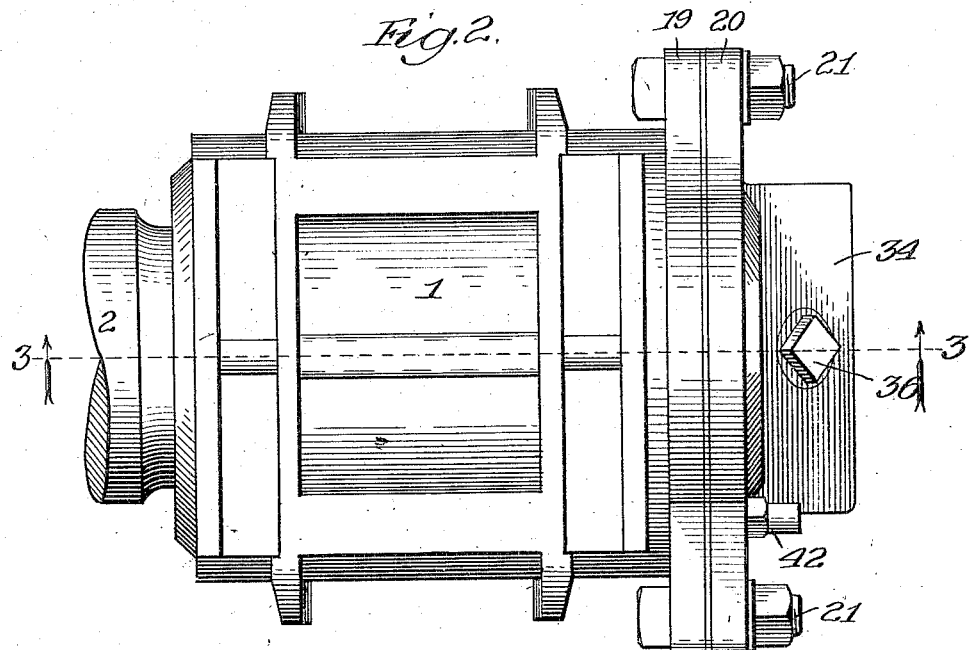
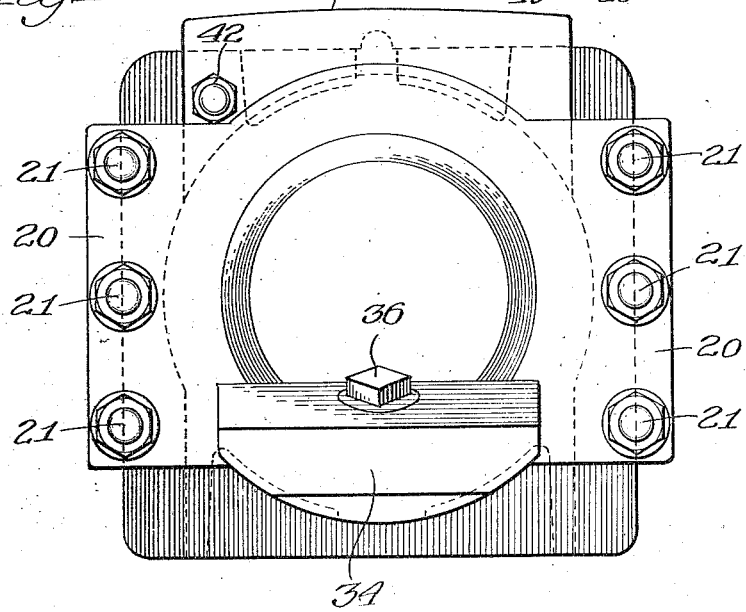

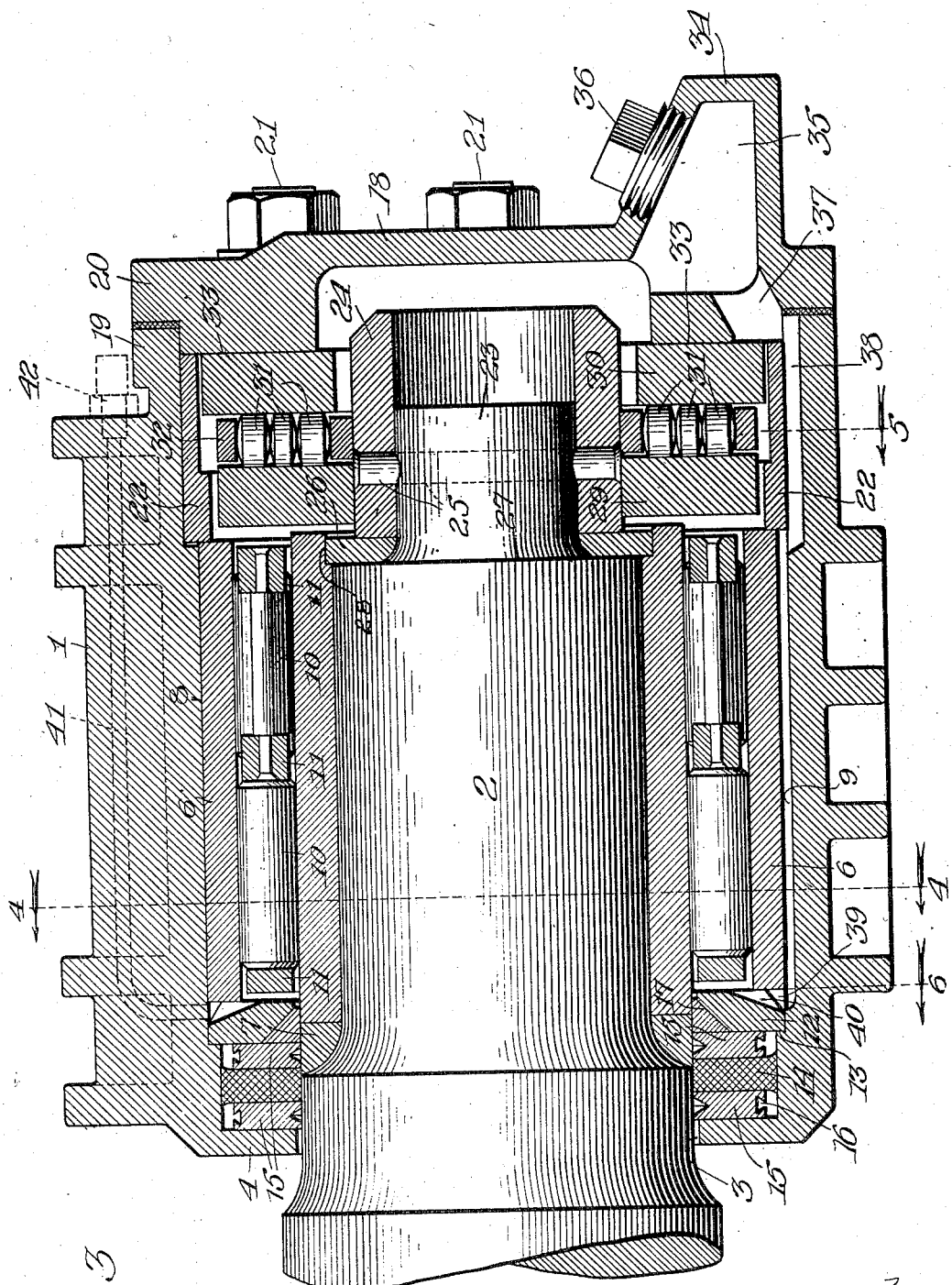

Patented July 1, 1930

1,768,925

UNITED STATES PATENT OFFICE

OSWALD F. PACKER, OF LAWTON, MICHIGAN, ASSIGNOR TO STEARNS-STAFFORD ROLLER BEARING COMPANY, OF LAWTON, MICHIGAN, A CORPORATION OF DELAWARE

ROLLER-BEARING JOURNAL BOX

Application filed February 4, 1927. Serial No. 165,771.

This invention relates to improvements in roller bearing journal boxes for railway rolling stock.

One object of my invention is to provide a roller bearing journal box into which the bearing parts are readily and easily inserted in and removed from the box through the front of the same while the box is jacked up from the axle spindle.

Another object of my invention is to provide means whereby the hardened bushing on the spindle may be readily pulled off of the same, and thus avoid spoiling either the spindle or the bushing. I may accomplish this by providing a soft metal ring about the spindle at the inner end of the bushing so that the ring may be cut away to reach the inner end of the bushing and thus permit it being pulled off the axle spindle.

A further object of my invention is to provide means for normally locking the bushing on the spindle so that the bushing will be held from working off the spindle in the rotation of the axle and under the jars and strains to which the bushing is subjected when in service.

A further object of my invention is to provide means for holding the outer bushing in the box against rotation, yet permitting this bushing to be readily removed when desired on taking off the cover at the front end of the box.

A still further object of my invention is to provide a roller bearing journal box structure which is not only simple in construction, but which may be made with a less number of operations than heretofore and with fewer parts, and one which will permit assembly and disassembly in shorter periods of time, which is very beneficial to repairs and replacements.

The invention consists further in the matters hereinafter described and claimed.

In the accompanying drawings—

Fig. 1 is a front elevational view of a roller bearing journal box constructed in accordance with my invention;

Fig. 2 is a top plan view of the box;

Fig. 3 is an enlarged longitudinal vertical sectional view taken on line 3—3 of Fig. 2;

Figure 4:
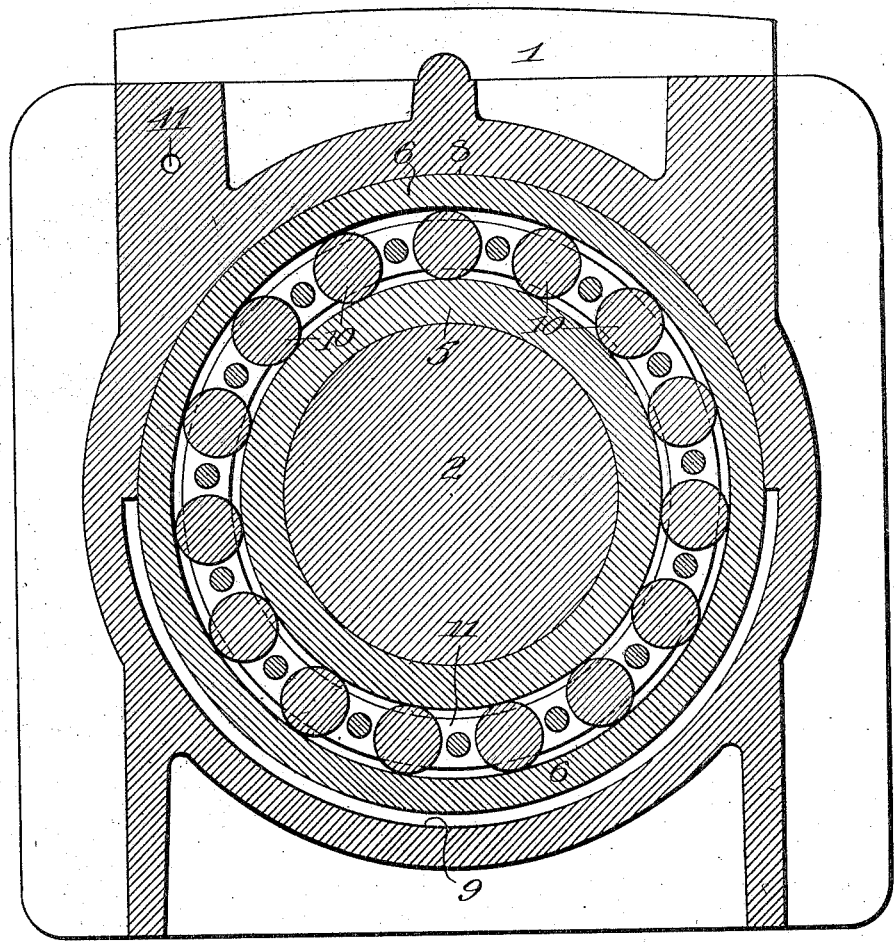
Fig. 4 is a transverse sectional view taken on line 4—4 of Fig. 3.
Figure 6:
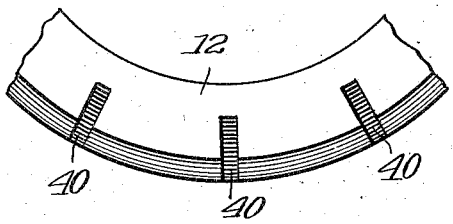
Fig. 6 is a face view of a portion of the retainer ring to be hereinafter more fully described, taken on line 6— of Fig. 3.
Figure 5:
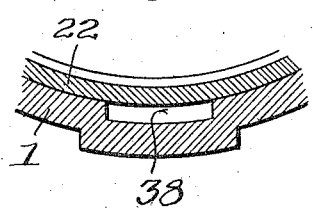
Fig. 5 is a fragmentary similar sectional view taken on line 5— of Fig. 3.

In the drawings, 1 indicates the journal box and 2 the axle spindle extending into the box through an opening 3 in the rear end wall 4 of the box. This wall is preferably cast integral with the body of the box so as to avoid the use of separate flanges or rings as heretofore, and thus simplify and reduce the cost of the box structure.

Disposed in the box about the spindle 2 are a pair of inner and outer hardened steel bushings 5, 6, with the former having a pressed fit on the spindle 2. The bushing 5 has its inner end terminating short of the inner end of the spindle 2 to provide a space to receive a ring 7 of soft metal, which may be readily cut away and be removed from the spindle so as to expose the inner end of the bushing 5 when it is desired to engage the same for pulling the bushing off the spindle. Thus the bushing may be removed from the spindle without spoiling either the spindle or the bushing. As shown in Fig. 3, the spindle 2 joins the axle on a radius as usual in the Master Car Builders' specifications, and the soft ring 7 is made to conform thereto. With this soft ring it will be unnecessary to make the inner end of the bushing conform to this radius, which naturally reduces the expense of making the bushing.

As shown in Fig. 4, the chamber within the box 1 to receive the bearing parts for the spindle has its upper surface 8 machined on one radius and its lower surface 9 formed on a larger radius. The outer bushing 6 fits against the upper surface 8 when in its proper place in the box, and is held against the same by the weight of the load on the truck frame in which the box is mounted. By making the lower surface 9 larger, the bushing 6 may move out of contact with the upper bearing surface 8 when the box is jacked up with respect to the axle 2 when it is desired either to remove the bushing from the box or to insert the bushing therein.

Between the bushings 5, 6 are bearing rollers 10, 10, which may be caged as a single or a multiple group. When of the latter type, these rollers would be between outer and inner retaining rings 11, 11 of the roller cage, as shown in Fig. 3. For the inner end of the roller cage, I provide a hardened guide ring 12, which is held against an annular shoulder 13 in the box by the outer bushing 6. Between the ring 12 and the rear wall 4 of the box, I provide a packing assembly which preferably consists of an inner ring 14 of suitable packing material, such as felt, and holding rings 15, 15 on opposite sides thereof, as shown in Fig. 3.

The rings 15 may be made of any suitable material, cast-iron being preferable, and they are provided on their outer peripheries with a plurality of suitably spaced notches 16 whereby the rings may be pulled out through the front of the box by the use of hooks inserted into the box when the cover, to be hereinafter referred to, is removed. These rings have oil grooves where they encircle the spindle, as shown. The guide ring 12 has a part of its inner peripheral portion cut away at an angle to provide a recess to receive a triangular shaped packing ring 17, which is held in this recess by the packing structure to the rear of the ring. The ring 17 aids in closing up the outlet to the escape of oil to the rear end of the box.

The outer end of the box is closed by a cover 18. The box and the cover have cooperating flanges 19, 20 (Fig. 2) on opposite sides thereof so that bolts 21 may be inserted through holes in these flanges for removably securing the cover to the box. In using bolts to secure the cover to the box, it is unnecessary to tap or thread holes in either the cover or the box or to use expensive studs as heretofore, thus greatly simplifying the manufacture of the box and lessening its cost of production.

A filler ring 22 (Fig. 3) is supported in the box forward of the outer bushing 6. This ring extends between the outer end of said bushing and the cover 18 of the box so that when the cover is clamped over the outer end of the box to close the same it forces the filler ring against the outer bushing 6 and, in turn, forces said bushing against the guide ring 12 to hold it against its shoulder 13, and moreover hold the packing ring structure 14, 15, and 17 in place in the box.

The extreme outer end portion 23 of the spindle 2 is reduced, as shown in Fig. 3, and extends toward the cover 18 forward of the bushings 5, 6. A hardened collar 24 has a pressed fit on this reduced end 23 and is fixed thereto by a rivet 25 which is inserted through both the reduced end and the collar. The collar 24 holds a disk 26 against the shoulder 27 at the inner end of the reduced end 23. This disk projects slightly beyond the outer periphery of the spindle 2 and engages in a recess 28 formed in the outer end of the bushing 5 where it extends beyond the spindle 2. The disk 26 thus provides a locking means for holding the bushing 5 from working off the spindle during the rotation of the the same, and also when under the shocks and strains of service. This is an important factor because the bushing 5 is held in place even though it might not have the proper pressed fit on the spindle, as is likely to happen during the process of manufacture.

Surrounding the collar 24 is an end thrust bearing assembly comprising an inner ring 29 and an outer ring 30, preferably of hardened steel, and a plurality of antifriction rollers 31, 31 between the rings. These rollers are preferably arranged in groups in superimposed relation and are retained in a suitable cage 32. The outer ring 30 is engageable with an inwardly facing thrust surface 33 on the inside of the cover 18. This ring is also mounted in the filler ring 22, and the collar 24 extends through it with considerable clearance, as shown in Fig. 3. The inner ring 29 has a running fit on the collar 24, and suitable clearance is provided between the outer periphery of that ring and the filler member 22, as shown. Moreover, suitable clearance is provided between the outer end of the bushing 5 and the inner ring 29 so that the bushing when it moves outward with the spindle 2 under an end thrust may move into contact with said inner ring and transfer the end thrust to the cover 18. It is to be noted that there are no projections on either the collar 24 or the reduced end 23 of the spindle to retard or interfere with the movement of the spindle 2 and associated parts in a direction away from the cover 18 when transmitting end thrusts to the box at the opposite end of the spindle. Thus the spindle is free to move endwise in opposite directions, and its end thrusts are taken up on either one side or the other through the end thrust bearings and the covers of the boxes. Furthermore, by using the collar 24 and riveting it to the reduced end 23 of the spindle, the use of expensive threads on the reduced end of the spindle to receive a collar or equivalent part is avoided, thus further reducing the cost of the bearing installation and simplifying the same.

The cover 18 is provided with an outwardly projecting part 34 in line with the lower part of the box. This projection forms an oil or lubricant reservoir 35 having an inspection and filling opening on its top wall, which opening may be normally closed by a screw plug 36, as shown in Fig. 3. This chamber has communication by a passage 37 with the interior of the box so that the bearing parts within the same may run in lubricant, the level of which stands in the chamber 35 and may be inspected from time to time on removing the plug 36. This chamber formed below the bushing 6 by the enlarged lower portion 9 within the box is connected with the passage 37 by an oil groove 38 beneath the filler ring 22.

The outer corner of the guide ring 12 adjacent the bearing rollers 10 is cut away to provide an annular channel 39 between the box and the ring. The ring 12 is provided with a plurality of radial oil grooves 40 in its face adjacent the roller bearings, and these grooves open at their outer ends into the channel 39, and at their inner ends into the space between the bushings 5, 6, as shown in Fig. 3. A suitable lubricant is fed to this channel through a pasageway 41 cored in the top of the box 1 and having at its outer end a suitable fitting 42, through which the lubricant may be injected through the medium of a pressure gun.

The details of structure and arrangement of parts shown may be variously changed and modified without departing from the spirit and scope of my invention.

I claim as my invention:

1. In an assembly of the character described, the combination with a journal box, of an axle spindle extending into the box through the rear wall thereof which wall extends inward toward the spindle, a bushing in the box and surrounding the spindle, bearing rollers between the spindle and the bushing, packing means about the spindle inside of the rear wall of the box and embracing a ring of packing material and metallic rings on opposite sides thereof, and a guide ring for the bearing rollers interposed between the same and the innermost metallic packing ring and held by said bushing against a shoulder in the body of the box in advance of said rear wall.

2. In an assembly of the character described, the combination with a journal box, of an axle spindle extending into said box through the rear wall thereof, a bushing in said box about the spindle, bearing rollers between the spindle and the bushing, and packing means between the bearing rollers and the rear wall of the box, said packing means including a guide ring for the bearing rollers and held against a shoulder in the box by the bushing, said ring having its edge adjacent the bushing cut away to provide an oil groove about the ring, said ring having a plurality of slots therein so disposed as to carry oil from the groove toward the bearing rollers.

3. In an assembly of the character described, the combination with a journal box, of an axle spindle extending into the box through the rear wall thereof, which wall extends inward toward the spindle, a bushing in the box about the spindle, bearing rollers between the spindle and the box, packing means about the spindle inside of said rear wall, a guide ring for the rollers and located between the same and said packing means, said ring having its outer peripheral portion held by the bushing against a shoulder in the body of the box in advance of said rear wall, the inner peripheral portion of the ring adjacent the packing means being cut away to provide a recess to receive a packing which is held in said recess by the packing means, said recess being so formed that the packing means forces the packing in the same.

4. In an assembly of the character described, the combination with a journal box, of an axle having its outer end portion reduced in diameter to provide a spindle and disposed in the box, a hardened steel bushing fitted about the spindle and terminating short of the juncture of the spindle with the axle, a filling ring about the spindle between the axle and the inner end of the bushing, said ring being substantially flush with the outer surfaces of the axle and the bushing, respectively, and constituting an end for the bushing at the axle, said ring being made of a soft metal so that it may be readily cut away to permit the inner end of the bushing being reached for pulling the same from the spindle, and bearing means for the spindle between the bushing and the box.

5. In an assembly of the character described, the combination with a journal box, of an axle having its outer end portion reduced in diameter to provide a spindle and disposed in the box, a hardened steel bushing fitted about the spindle and terminating short of the juncture of the spindle with the box, a filling ring about the spindle between the axle and the inner end of the bushing and conforming to the radial contour where the spindle joins the axle, said ring being substantially flush with the outer faces of the axle and bushing, respectively, and constituting an end for the bushing at the axle, said ring being made of a relatively soft metal so that the ring may be cut away to permit access to be had to the inner end of the bushing for pulling it from the spindle, and bearing means for the spindle between the bushing and the box.

6. In an assembly of the character described, the combination with a journal box, of an axle having its outer end extending into the box to provide a spindle portion with the extreme outer end of the latter reduced in diameter to provide a shoulder, a hardened steel bushing having a pressed fit on the spindle portion, a collar fixed on the reduced end of the spindle beyond the outer end of the bushing, a disc about the reduced end of the spindle and held against said shoulder by said collar, said bushing having a recess in its outer end to receive the outer peripheral portion of the disc, and bearing rollers in the box between the bushing and the box.

7. In an assembly of the character described, the combination with a journal box, of an axle having its outer end extending into the box to provide a spindle portion with the extreme outer end of the latter reduced in diameter to provide a shoulder, a hardened steel bushing having a pressed fit on the spindle portion, a hardened steel collar fixed on the reduced end of the spindle beyond the outer end of the bushing, a disk about the reduced end of the spindle and held against said shoulder by said collar, said disk extending beyond the periphery of the spindle portion and engaging in a recess in the outer end of the bushing for holding the latter from working off the spindle, and radial and end thrust antifriction bearing means in the box for the bushing and collar, respectively, said end thrust bearing means surrounding the collar beyond the outer end of the bushing.

8. In an assembly of the character described, the combination with a journal box, of an axle spindle extending into the box through the rear end thereof, a cover closing the front end of the box, a bushing about the spindle and having a removable fit in the box, bearing rollers between the bushing and the spindle, a guide ring for the bearing rollers at the inner end of the bushing and held thereby against a shoulder in the body of the box, a filler ring disposed in the box between the outer end of the bushing and the cover and in contact with both of the same, end thrust anti-friction bearing means within said ring for the spindle, and means for clamping the cover on the box and for exerting a pressure on the bushing through the filler ring for holding the bushing against rotation.

9. In an assembly of the character described, the combination with a journal box, of an axial spindle extending into the box through the rear end thereof and terminating short of the front end of the box, a cover closing the front end of the box, a bushing in the box about the spindle and having a removable fit in the box, bearing rollers between the bushing and the spindle, a filler ring in the box between the outer end of the bushing in the cover and in abutting engagement with both of the same, an end thrust antifriction bearing assembly within the ring and comprising inner and outer bearing rings with bearing members therebetween, the outer bearing ring being supported by the filler ring, and means for clamping the cover on the box and for exerting a pressure on the bushing through the filler ring for holding the bushing against rotation.

10. In an assembly of the character described, the combination with a journal box, of an axle having its outer end extending into the box to provide a spindle portion with the extreme outer end of the latter reduced, a cover closing the outer end of the box and having an inwardly facing thrust surface, inner and outer bearing rings about the reduced end of the spindle to take the end thrusts thereof with the outer ring engageable with the thrust surface of the cover and the inner ring having a free running fit with respect to the spindle, antifriction bearing means between said rings, bearing rollers between the spindle portion of the axle and the box, and means for securing the cover to the box.

11. In an assembly of the character described, the combination with a journal box, of an axle having its outer end extending into the box to provide a spindle with the outer end of the latter reduced, a cover closing the front end of the box and having an inwardly facing thrust surface, inner and outer bearing rings surrounding the reduced outer end of the spindle with the outer ring engageable with the thrust surface of the cover, anti-friction bearing means between said rings, means for securing the cover to the box, a bushing having a pressed fit on the spindle portion and movable therewith against the inner ring to transmit the outer end thrust of the spindle of the cover, said inner ring having a free running fit with respect to the bushing and the spindle, and bearing rollers in the box between the same and the bushing.

12. In an assembly of the character described, the combination with a journal box, of an axle having its outer end extending into the box to provide a spindle portion with the outer end of the latter reduced, a cover closing the outer end of the box and having an inwardly facing thrust surface, a hardened collar fixed to the reduced end of the spindle, inner and outer bearing rings about said collar with the inner ring having a free running fit on said collar and the outer ring engageable with the thrust surface of the cover, antifriction bearing means between said rings, a hardened bushing having a pressed fit on the spindle portion of the axle and movable therewith against the inner bearing ring to transmit the outer end thrust of the spindle to the cover, means for securing the cover to the box, and bearing rollers in the box between the same and the bushing.

13. In an assembly of the character described, the combination with a journal box, of an axle having its outer end extending into the box to provide a spindle with the extreme outer end of the latter reduced, a cover closing the outer end of the box and having an inwardly facing thrust surface, inner and outer hardened bushings about the spindle portion with the inner bushing having a pressed fit thereon and the outer bushing removably mounted in the box, bearing rollers between said bushings, a filler ring in the box and extending between the cover and the outer end of the outer bushing, an end thrust bearing assembly for the axle about the reduced outer end thereof and embracing inner and outer bearing rings, the inner ring having a running fit with respect to the reduced end of the spindle and the inner bushing thereon and the outer ring being supported by said filler ring, said outer ring having a clearance between its inner periphery and the adjacent portion of the spindle so that the outer ring will not revolve with the spindle, and means for securing the cover to the box.

14. In an assembly of the character described, the combination with a railway journal box having within the same a bearing receiving chamber having a rigid and unyielding surrounding body wall, of an axle spindle projecting into said chamber through one end of the box, and an antifriction bearing assembly in said chamber between the body wall and the spindle to provide a bearing therefor, said bearing assembly including an outer hardened bushing removably mounted in said chamber, the upper portion of said chamber forming a seat for the bushing and being initially and permanently formed to conform to the outer curvature of the bushing, the lower portion of the chamber being made larger than the bushing so that the latter may be released from contact with the upper part of the chamber on jacking up the box with respect to the axle spindle when it is desired to remove the bearing and the bushing from the box.

15. In an assembly of the character described, the combination with a railway journal box having within the same a bearing receiving chamber having a rigid and unyielding surrounding body wall, of an axle spindle projecting into said chamber through one end of the box, and an antifriction bearing assembly in said chamber between the body wall and the spindle to provide a bearing therefor, said bearing assembly including an outer hardened bushing removably mounted in said chamber, the upper half of the chamber forming a seat for the bushing and being machined on a radius conforming to that of the bushing, the lower half of said chamber being formed on a larger radius so that the bushing may be released from contact with the upper half of the chamber on jacking up the box with respect to the axle spindle when it is desired to remove the bearing and the bushing from the box.

16. In an assembly of the character described, the combination with a journal box, of an axle spindle projecting into the box through the rear end thereof, an antifriction bearing assembly in the box between the same and the spindle to provide a bearing therefor, said assembly including an outer bushing having a removable fit in the box so that said bushing and bearing assembly may be readily and easily inserted into and removed from the box through the front end of the same, and a cover bolted to the front end of the box for closing the same.

In testimony whereof I affix my signature this 1st day of Feb., 1927.

OSWALD F. PACKER.